United States Patent
Lu

(10) Patent No.: US 10,627,032 B2
(45) Date of Patent: Apr. 21, 2020

(54) QUICK CONNECTION STRUCTURE OF FAUCET OUTLET PIPE

(71) Applicant: PPI Xiamen Industry Co., Ltd., Xiamen (CN)

(72) Inventor: Wenrong Lu, Xiamen (CN)

(73) Assignee: PPI XIAMEN INDUSTRY CO., LTD., Xiamen, Fujian (CN)

( * ) Notice: Subject to any disclaimer, the term of this patent is extended or adjusted under 35 U.S.C. 154(b) by 817 days.

(21) Appl. No.: 15/216,721

(22) Filed: Jul. 22, 2016

(65) Prior Publication Data
US 2018/0023741 A1 Jan. 25, 2018

(51) Int. Cl.
*F16L 37/084* (2006.01)
*F16L 37/086* (2006.01)

(52) U.S. Cl.
CPC ......... *F16L 37/0841* (2013.01); *F16L 37/086* (2013.01)

(58) Field of Classification Search
CPC ...... F16L 37/0841; F16L 37/086; F16L 37/26
USPC ........................................ 285/305, 308, 317
See application file for complete search history.

(56) References Cited

U.S. PATENT DOCUMENTS

| | | | | |
|---|---|---|---|---|
| 5,090,747 A * | 2/1992 | Kotake | ................... | F16B 21/16 285/305 |
| 6,142,537 A * | 11/2000 | Shimada | ............... | F16L 37/088 285/308 |
| 6,652,007 B1 * | 11/2003 | Hwang | ................ | F02M 55/004 285/305 |
| 8,371,620 B1 * | 2/2013 | Yang | ........................ | F16L 37/14 285/305 |
| 9,022,433 B2 * | 5/2015 | Yang | ..................... | E03C 1/0403 285/320 |
| 2004/0079775 A1 * | 4/2004 | Choi | .......................... | A45F 3/20 224/148.2 |
| 2005/0218650 A1 * | 10/2005 | Pepe | ...................... | F16L 37/088 285/308 |
| 2014/0062080 A1 * | 3/2014 | Battisti | .................... | F16L 37/08 285/86 |
| 2015/0145243 A1 * | 5/2015 | Dude | ................... | F16L 37/0982 285/308 |

(Continued)

FOREIGN PATENT DOCUMENTS

| | | | | |
|---|---|---|---|---|
| CA | 2917540 A1 * | 7/2016 | .............. | F16L 37/12 |
| DE | 102008010737 A1 * | 8/2009 | ........... | F16L 37/0841 |

*Primary Examiner* — Anna M Momper
*Assistant Examiner* — Fannie C Kee
(74) *Attorney, Agent, or Firm* — Leong C. Lei

(57) ABSTRACT

A quick connection structure of a faucet outlet pipe includes an upper pipe, a lower pipe, and a connector. The upper pipe and the lower pipe are connected through the connector in a quick manner. The connector includes a connecting sleeve, a left elastic block, and a right elastic block. A central portion of the connecting sleeve is transversely formed with an opening. The left elastic block and the right elastic block face each other and are movably installed in the opening to hold against the upper pipe elastically. A top of the connecting sleeve is formed with a receiving hole for insertion of the upper pipe. A bottom of the opening is formed with a connecting hole to mate with the upper pipe. The connecting sleeve is provided with a connecting post extending downward from the connecting hole for connection of the lower pipe.

4 Claims, 12 Drawing Sheets

(56) References Cited

U.S. PATENT DOCUMENTS

2016/0201835 A1* 7/2016 Jones ...................... F16L 37/12
285/305

* cited by examiner

QUICK CONNECTION STRUCTURE OF FAUCET OUTLET PIPE

BACKGROUND OF THE INVENTION

1. Field of the Invention

The present invention relates to a water pipe fitting, and more particularly to a quick connection structure of a faucet outlet pipe.

2. Description of the Prior Art

In general, the operator needs to crouch under the sink or basin in the kitchen or bathroom for installing the outlet pipe of the faucet. Since the space under the sink or basin is small, it is inconvenient for operation. Sometime, the connection is not in place to cause a leak of water. Accordingly, the inventor of the present invention has devoted himself based on his many years of practical experiences to solve these problems.

SUMMARY OF THE INVENTION

The primary object of the present invention is to provide a quick connection structure of a faucet outlet pipe, which has a simple instruction and can be installed conveniently and quickly.

In order to achieve the aforesaid object, the quick connection structure of a faucet outlet pipe comprises an upper pipe, a lower pipe, and a connector. The upper pipe and the lower pipe are connected through the connector in a quick manner. The connector comprises a connecting sleeve, a left elastic block, and a right elastic block. A central portion of the connecting sleeve is transversely formed with an opening. The left elastic block and the right elastic block face each other and are movably installed in the opening to hold against the upper pipe elastically. A top of the connecting sleeve is longitudinally formed with a receiving hole for insertion of the upper pipe. A bottom of the opening is formed with a connecting hole to mate with the upper pipe. The connecting sleeve is provided with a connecting post extending downward from the connecting hole for connection of the lower pipe.

Preferably, the left elastic block and the right elastic block each comprise a press portion and a buckle piece which extends from a front end of the press portion and has a hollow middle portion to mate with the upper pipe. The buckle pieces of the left elastic block and the right elastic block are mutually staggered in a stepped manner.

Preferably, two sides of the buckle piece are provided with elastic arms with barbs. An inner wall of the opening is provided with ribs corresponding to the elastic arms. When the left elastic block and the right elastic block are installed and positioned, the barbs of the elastic arms of the buckle piece are engaged with the ribs.

Preferably, inner walls of front ends of the hollow middle portions of the left elastic block and the right elastic block are provided with engaging blocks, and a connecting end of the upper pipe is formed with an engaging groove to mate with the engaging blocks.

Preferably, the left elastic block and the right elastic block are provided with elastic configurations thereon.

Preferably, the elastic configurations are springs. Two ends of the spring of the left elastic block hold against an inner side of the press portion of the left elastic block and a front end face of the buckle piece of the right elastic block respectively. Two ends of the spring of the right elastic block hold against an inner side of the press portion of the right elastic block and a front end face of the buckle piece of the left elastic block respectively.

Preferably, the elastic configurations are elastic sheets disposed at the inner sides of the press portions of the left elastic block and the right elastic block. Lower ends of the elastic sheets hold against the connecting sleeve. Preferably, the connecting sleeve is provided with protruding blocks to hold against the elastic sheets.

Preferably, an end of the upper pipe, inserted into the receiving hole, is provided with a limit step to provide limit and block functions.

Preferably, an outer wall of the connecting post is formed with skidproof ribs to mate with the lower pipe tightly.

Accordingly, when assembled, the left elastic block and the right elastic block are pressed, such that the left elastic block and the right elastic block are moved towards each other and the hollow middle portions of the buckle pieces of the left elastic block and the right elastic block are aligned with each other. The upper pipe is inserted through the receiving hole of the connecting sleeve and the hollow middle portions of the buckle pieces of the left elastic block and the right elastic block to the connecting hole at the bottom of the opening. After connection, the left elastic block and the right elastic block are released. The left elastic block and the right elastic block are biased by the elastic configurations to hold against the upper pipe tightly. Afterward, the lower pipe is connected with the connecting post of the connecting sleeve. Thus, the upper pipe and the lower pipe are connected together. Compared to the prior art, the outlet pipe of the present invention can be quickly assembled and disassembled to ease the operation. For a narrow space, the present invention can be installed and replaced easily and conveniently, without using a tool during operation.

DETAILED DESCRIPTION OF THE PREFERRED EMBODIMENTS

Figure 1:
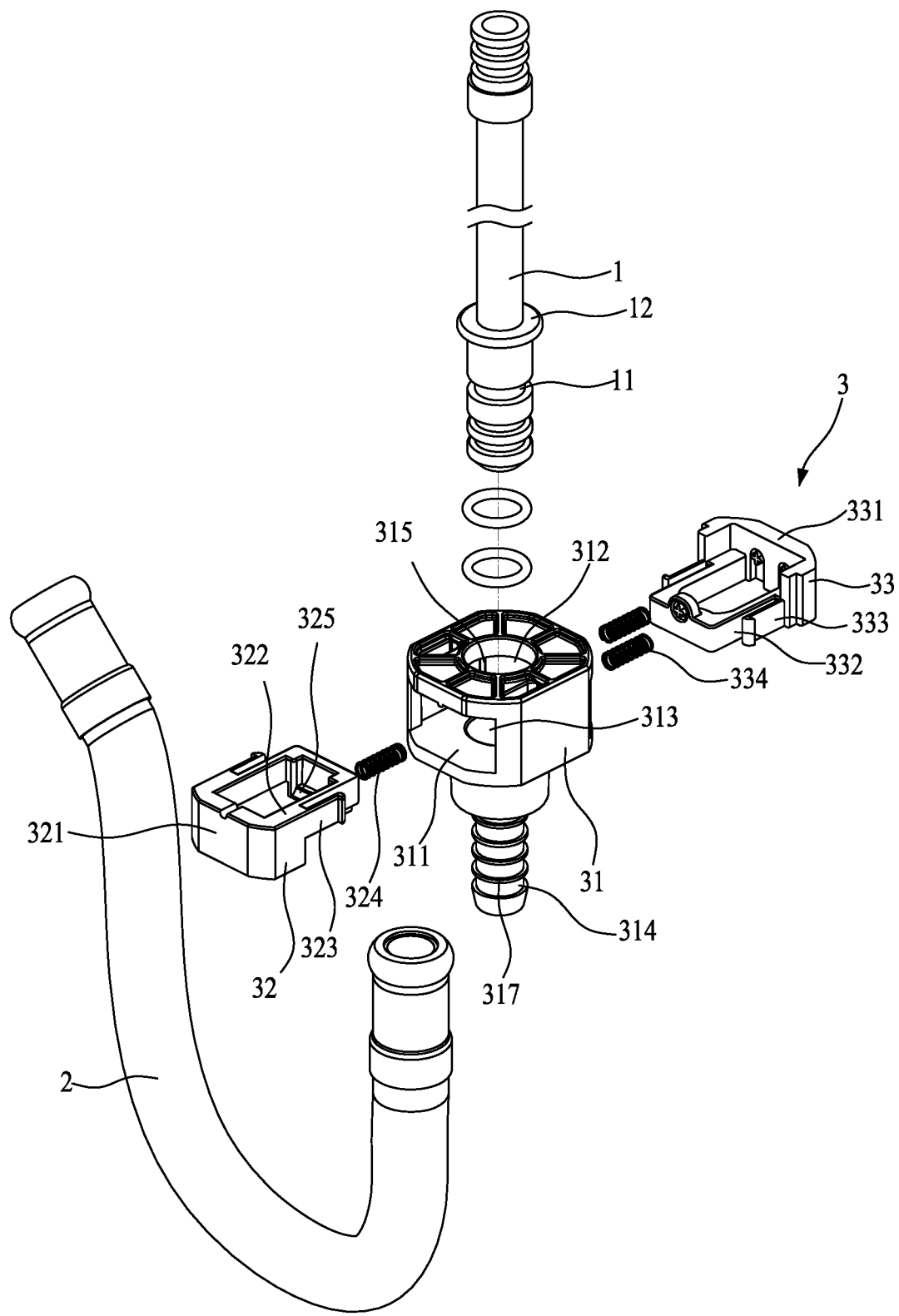
FIG. 1 is an exploded view according to a first embodiment of the present invention.

Embodiments of the present invention will now be described, by way of example only, with reference to the accompanying drawings.

As shown in FIG. 2 to FIG. 9, the present invention discloses a quick connection structure of a faucet outlet pipe. The quick connection structure comprises an upper pipe 1, a lower pipe 2, and a connector 3 for connecting the upper pipe 1 with the lower pipe 2. The connector 3 comprises a connecting sleeve 31, a left elastic block 32, and a right elastic block 33. A central portion of the connecting sleeve 31 is transversely formed with an opening 311. A central portion of the top of the connecting sleeve 31 is longitudinally formed with a receiving hole 312 communicating with the opening 311 for insertion of the upper pipe 1. A bottom of the opening 311 is formed with a connecting hole 313 to mate with the upper pipe 1. The connecting sleeve 31 is provided with a connecting post 314 extending downward from the connecting hole 311 for connection of the lower pipe 2. An outer wall of the connecting post 314 is formed with skidproof ribs 317 to mate with the lower pipe 2 tightly. The end of the upper pipe 1, inserted into the receiving hole 312, is provided with a limit step 12 to provide a limit function and block dust.

The left elastic block 32 and the right elastic block 33 face each other and are movably installed in the opening 311 of the connecting sleeve 31. The left elastic block 32 and the right elastic block 33 comprise press portions 321, 331 and buckle pieces 322, 332 which extend from the front ends of the press portions 321, 331 and have a hollow middle portion to mate with the upper pipe 1. The two buckle pieces 322, 332 are mutually staggered in a stepped manner. Two sides of the buckle pieces 322, 332 are provided with elastic arms 323, 333 with barbs. An inner wall of the opening 311 is provided with ribs 315 corresponding to the elastic arms 323, 333. When the left elastic block 32 and the right elastic block 33 are installed and positioned, the barbs of the elastic arms 323, 333 of the buckle pieces 322, 332 are engaged with the ribs 315 to prevent the left elastic block 32 and the right elastic block 33 from disengaging from the opening 311.

Figure 2:
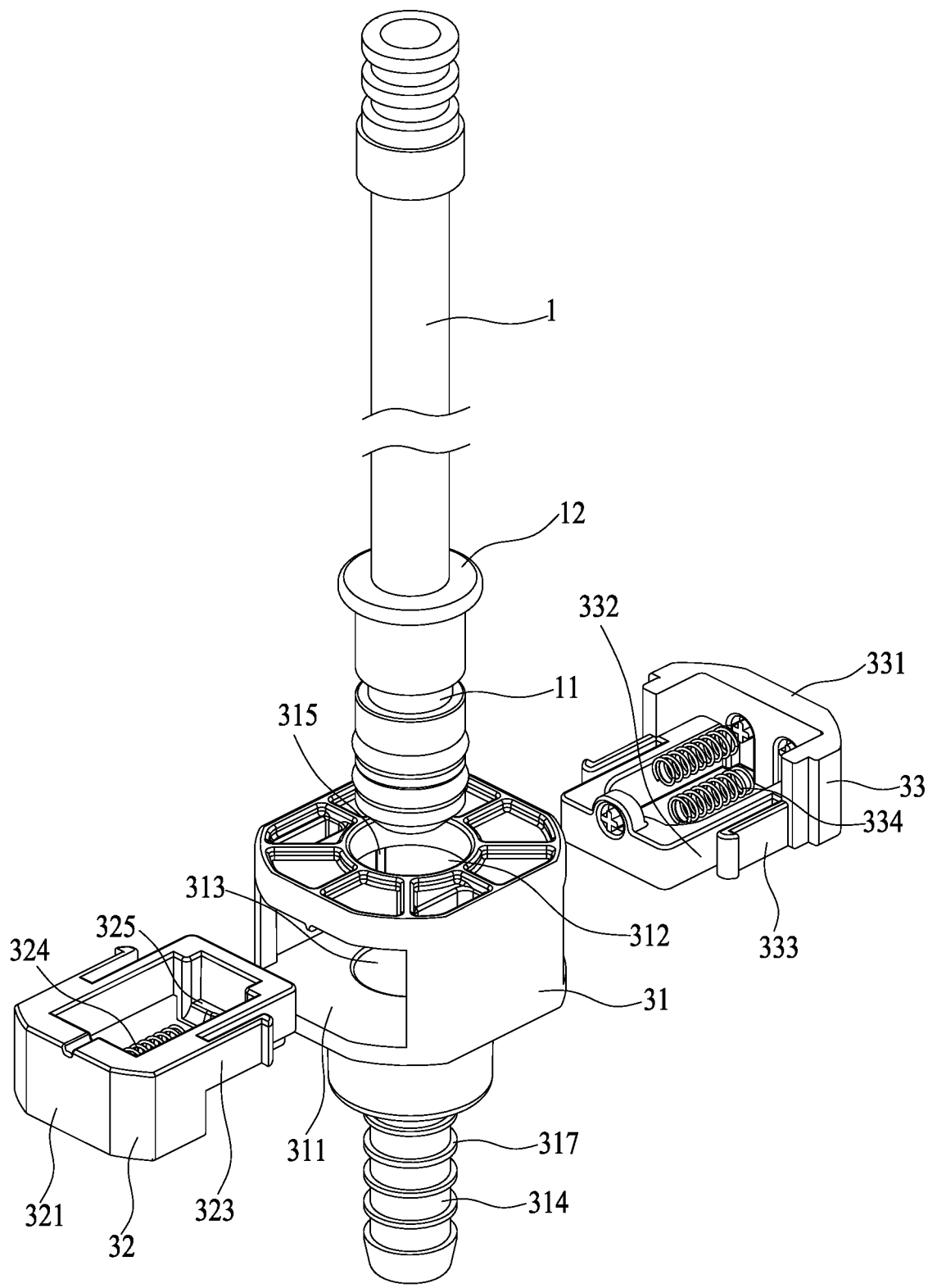
FIG. 2 is a partial assembled view according to the first embodiment of the present invention.
Figure 3:
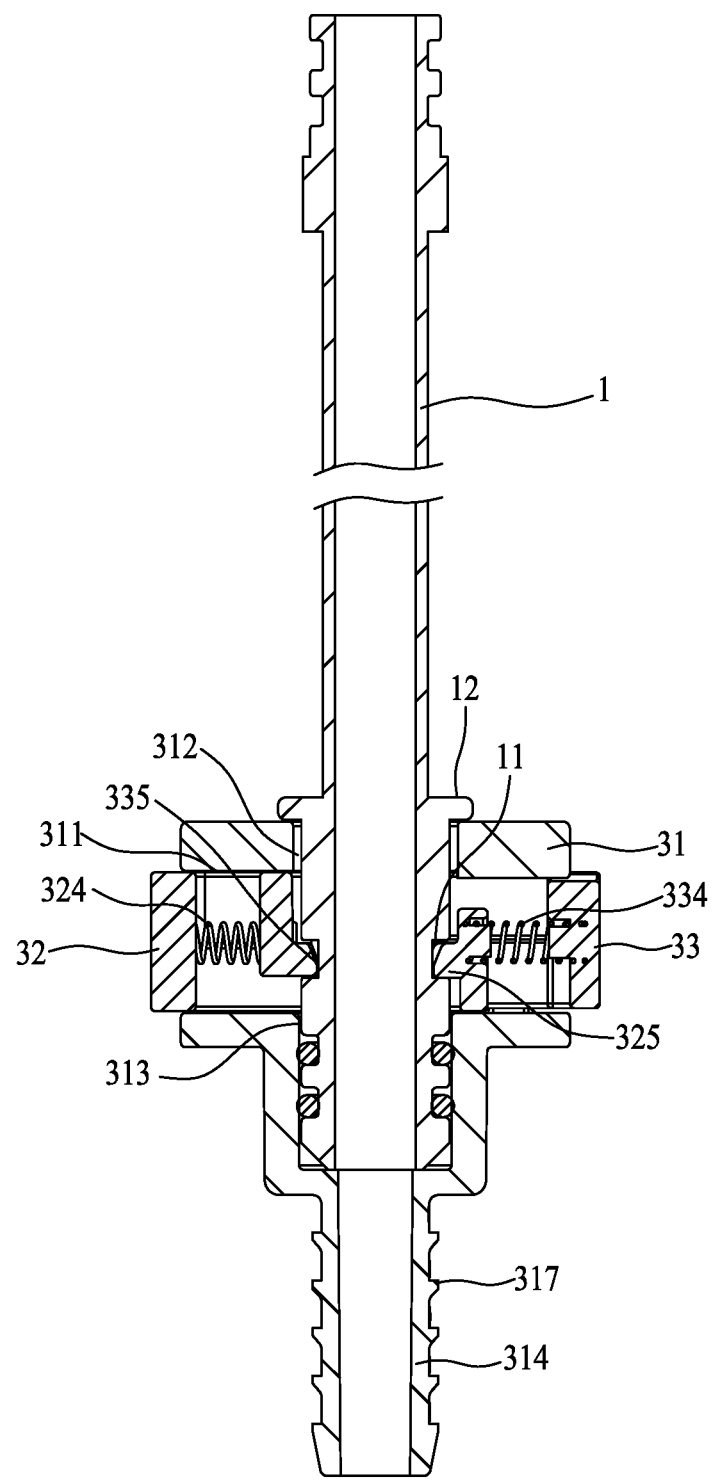
FIG. 3 is a sectional view according to the first embodiment of the present invention.
Figure 4:
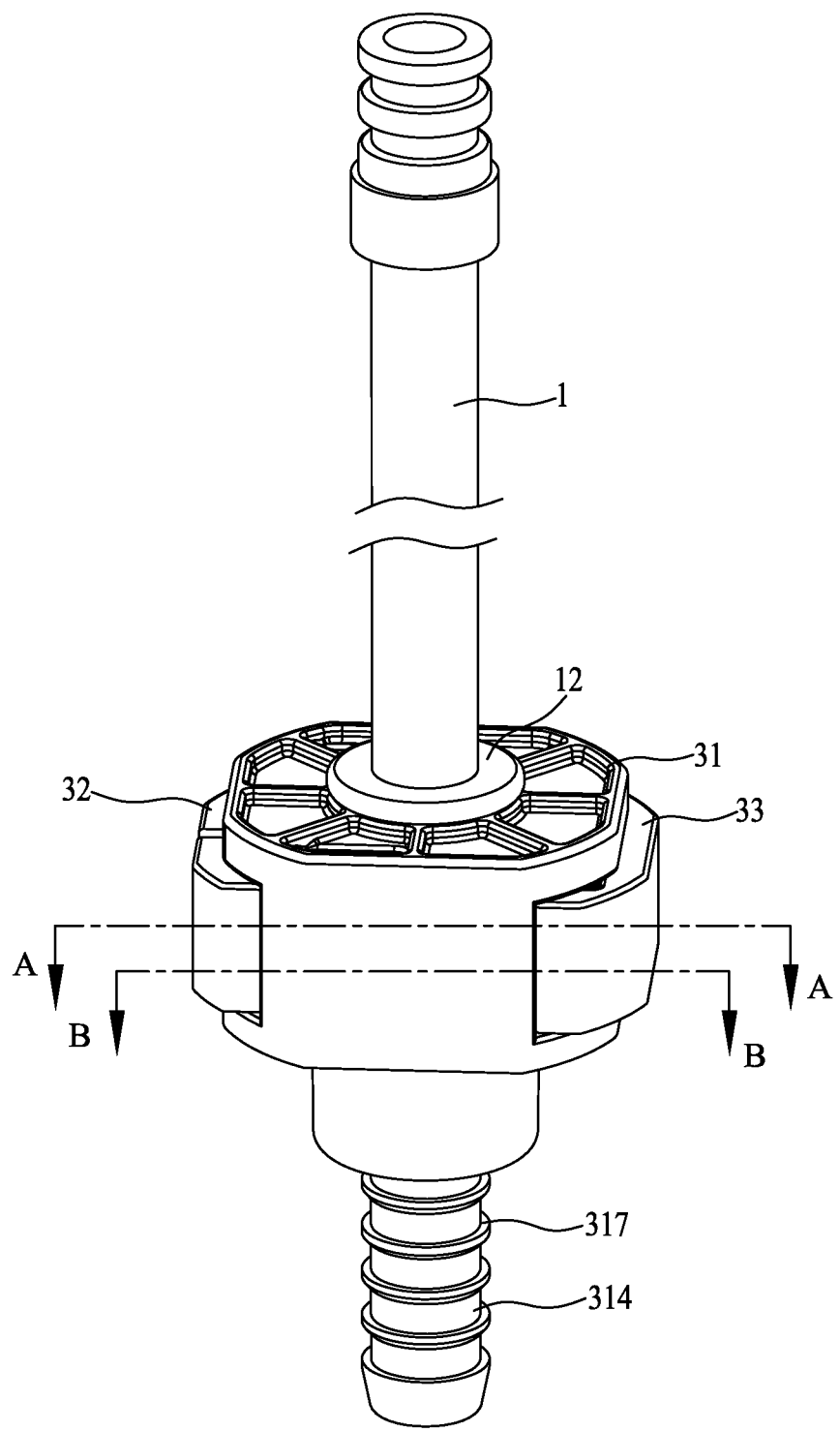
FIG. 4 is a perspective view according to the first embodiment of the present invention.
Figure 5:
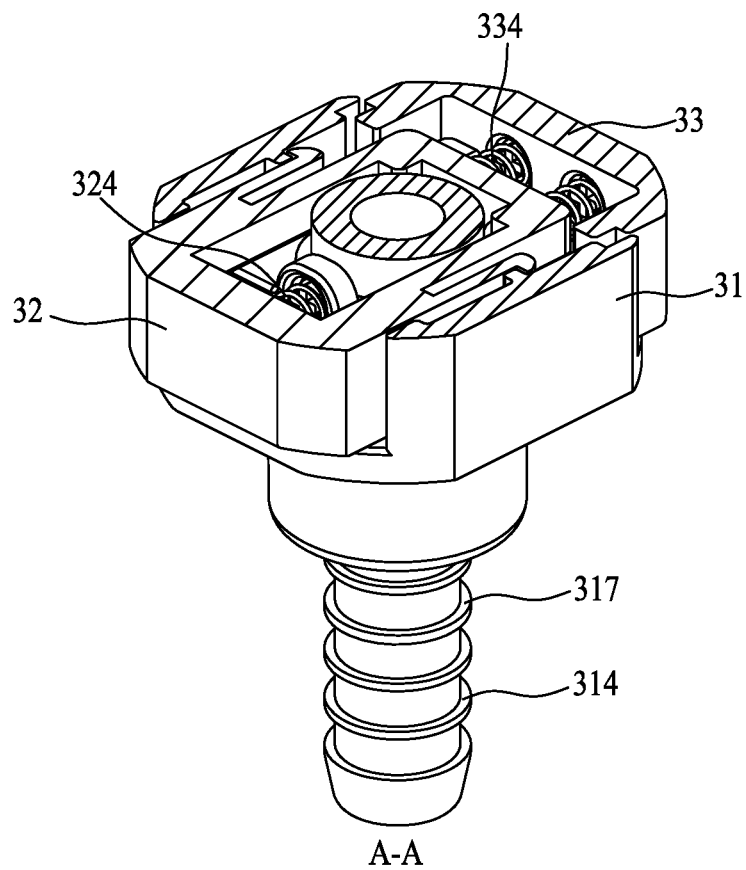
FIG. 5 is a sectional view taken along line A-A of FIG. 4.
Figure 6:
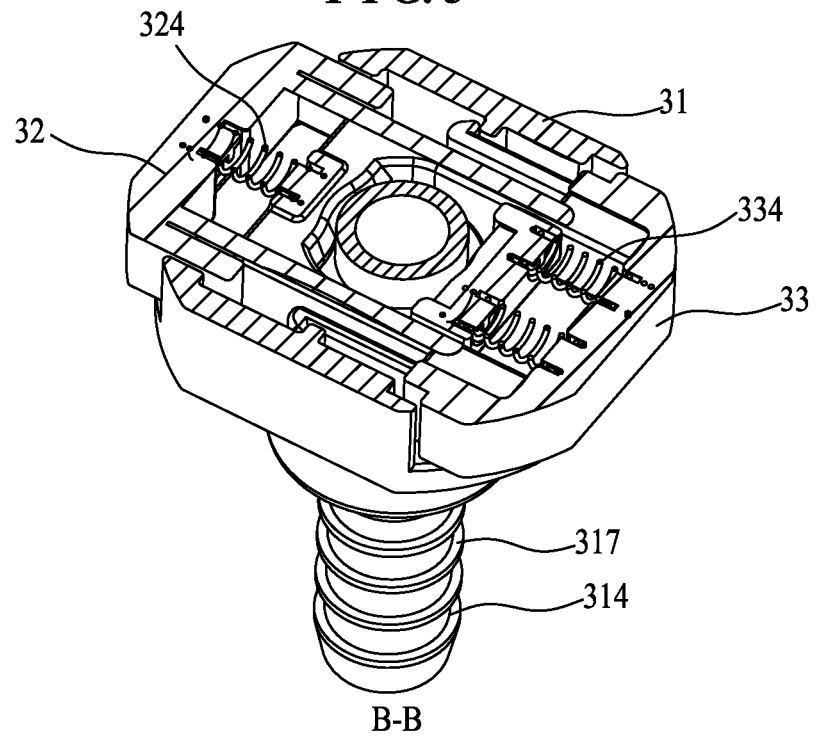
FIG. 6 is a sectional view taken along line B-B of FIG. 4.
Figure 7:
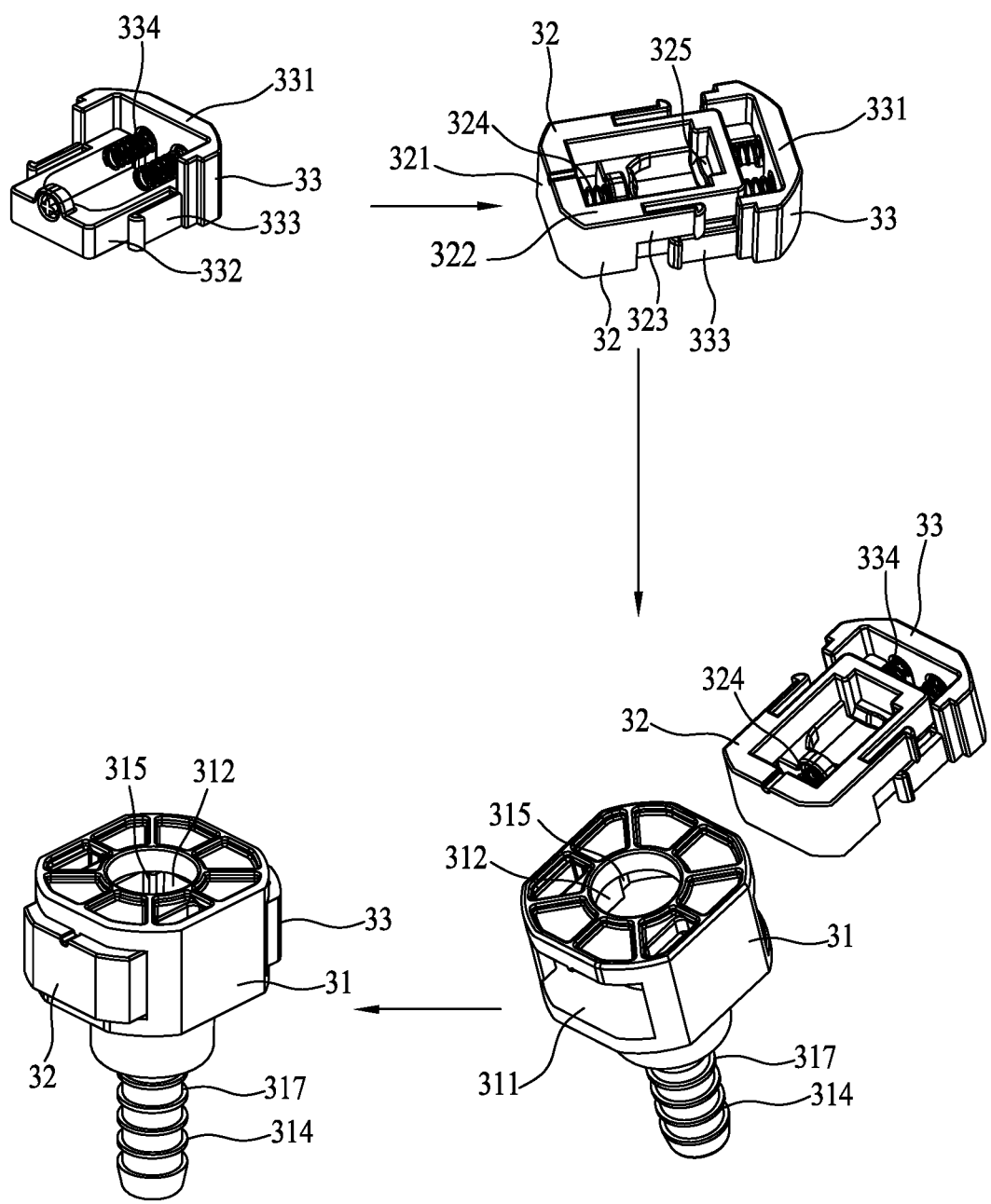
FIG. 7 is a schematic view showing the installation of the left and right elastic blocks according to the first embodiment of the present invention.
Figure 8:
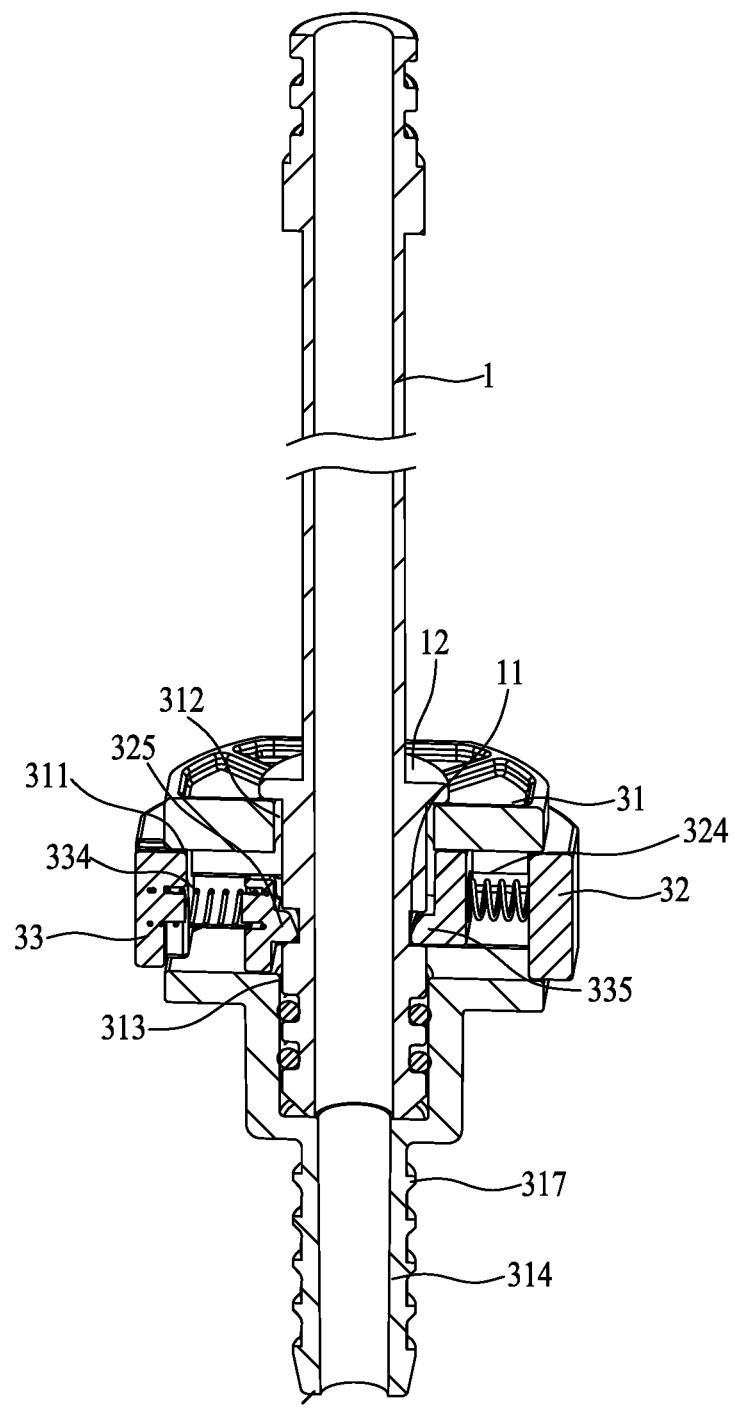
FIG. 8 is a schematic view showing the left and right elastic blocks to hold against the upper pipe according to the first embodiment of the present invention.
Figure 9:
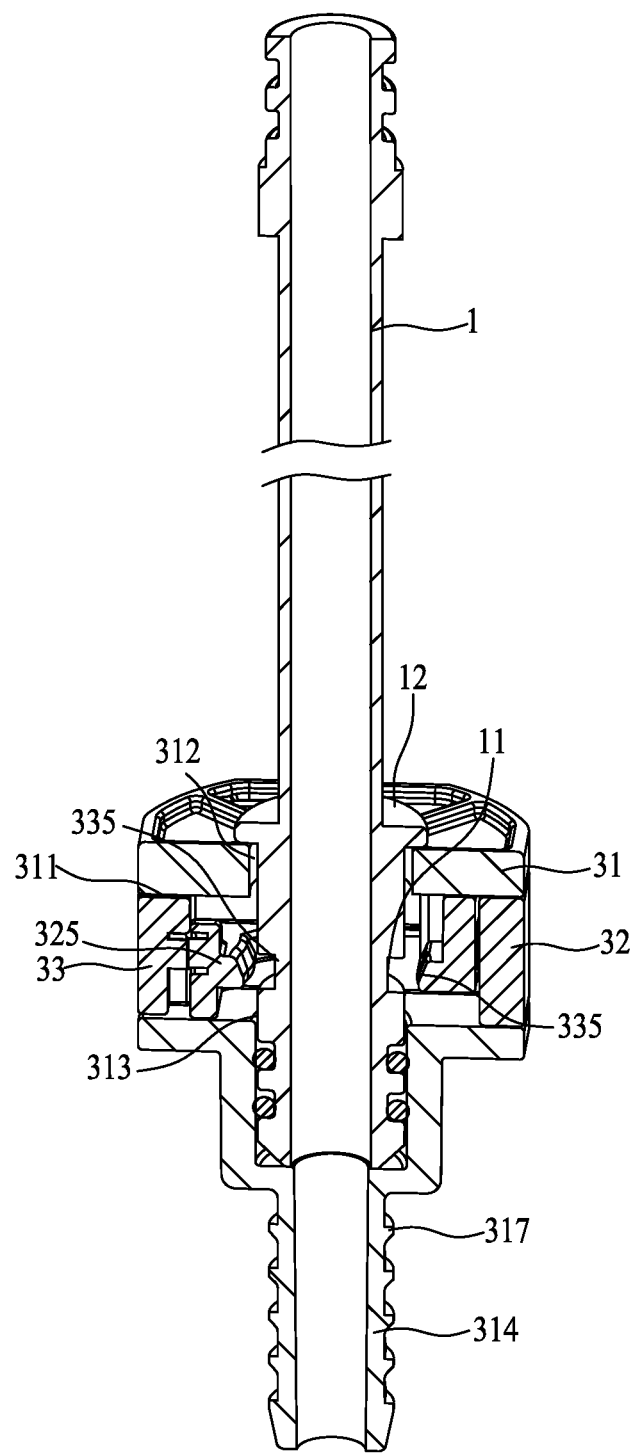
FIG. 9 is a schematic view showing the left and right elastic blocks to release the upper pipe according to the first embodiment of the present invention.

Furthermore, the left elastic block 32 and the right elastic block 33 are provided with elastic configurations. Referring to FIG. 2 and FIG. 6, in a first embodiment of the present invention, the elastic configurations are springs 324, 334 disposed at the inner sides of the press portions 321, 331 of the left elastic block 32 and the right elastic block 33. Two ends of the spring 324 of the left elastic block 32 hold against the inner side of the press portion 321 of the left elastic block 32 and the front end face of the buckle piece 332 of the right elastic block 33, respectively. Two ends of the spring 334 of the right elastic block 33 hold against the inner side of the press portion 331 of the right elastic block 33 and the front end face of the buckle piece 322 of the left elastic block 32, respectively. The springs 324, 334 always apply forces to the left elastic block 32 and the right elastic block 33 to hold the upper pipe 1 tightly.

Figure 10:
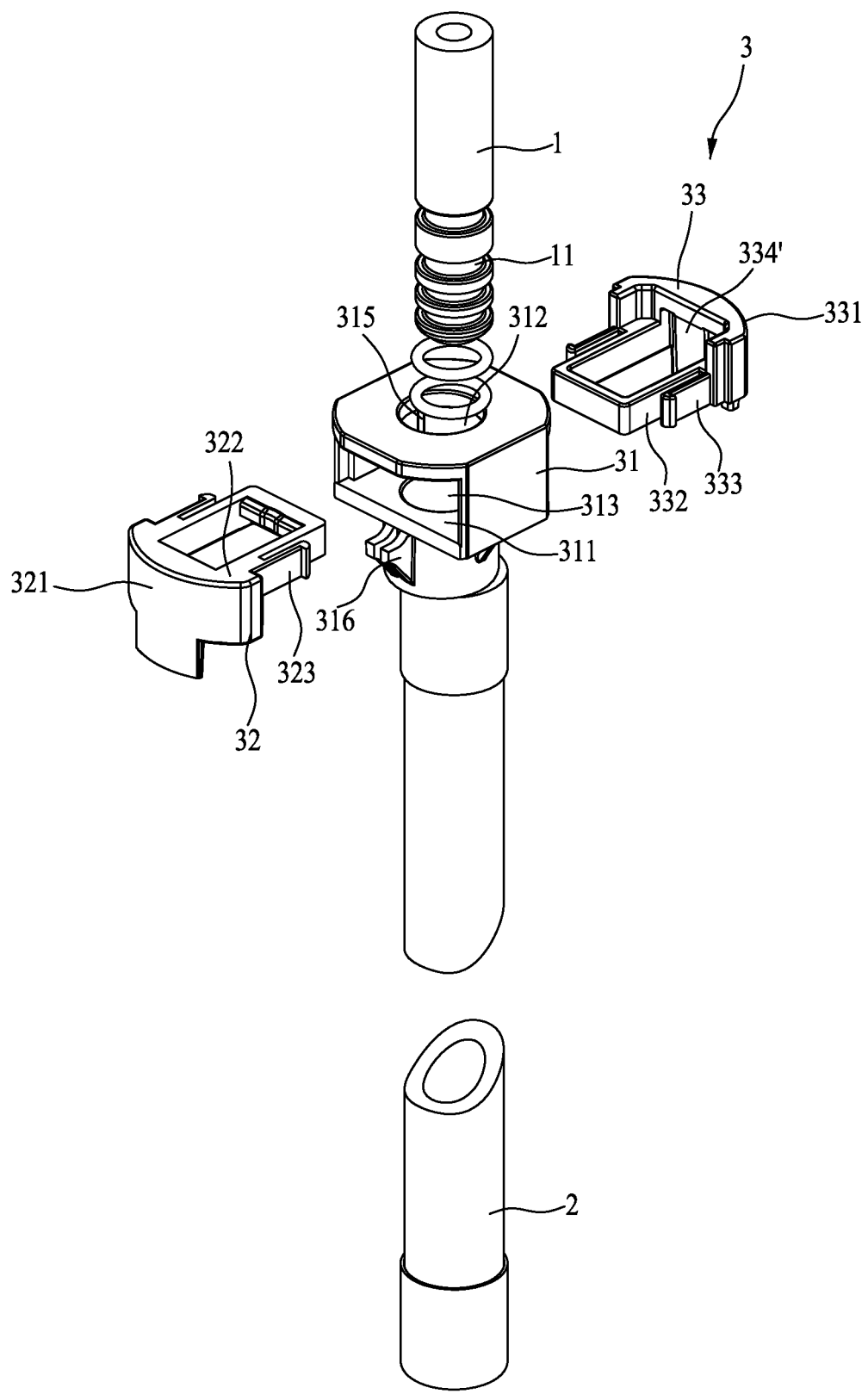
FIG. 10 is an exploded view according to a second embodiment of the present invention.
Figure 11:
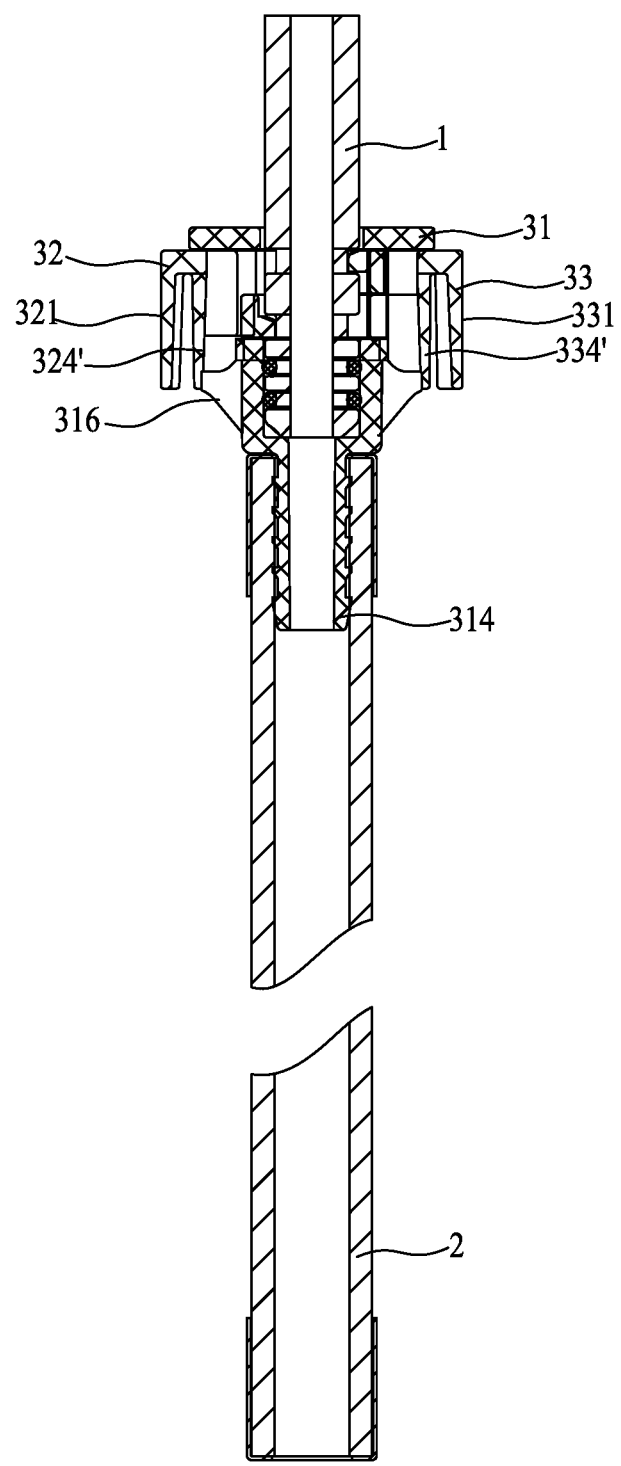
FIG. 11 is a sectional view according to the second embodiment of the present invention.
Figure 12:
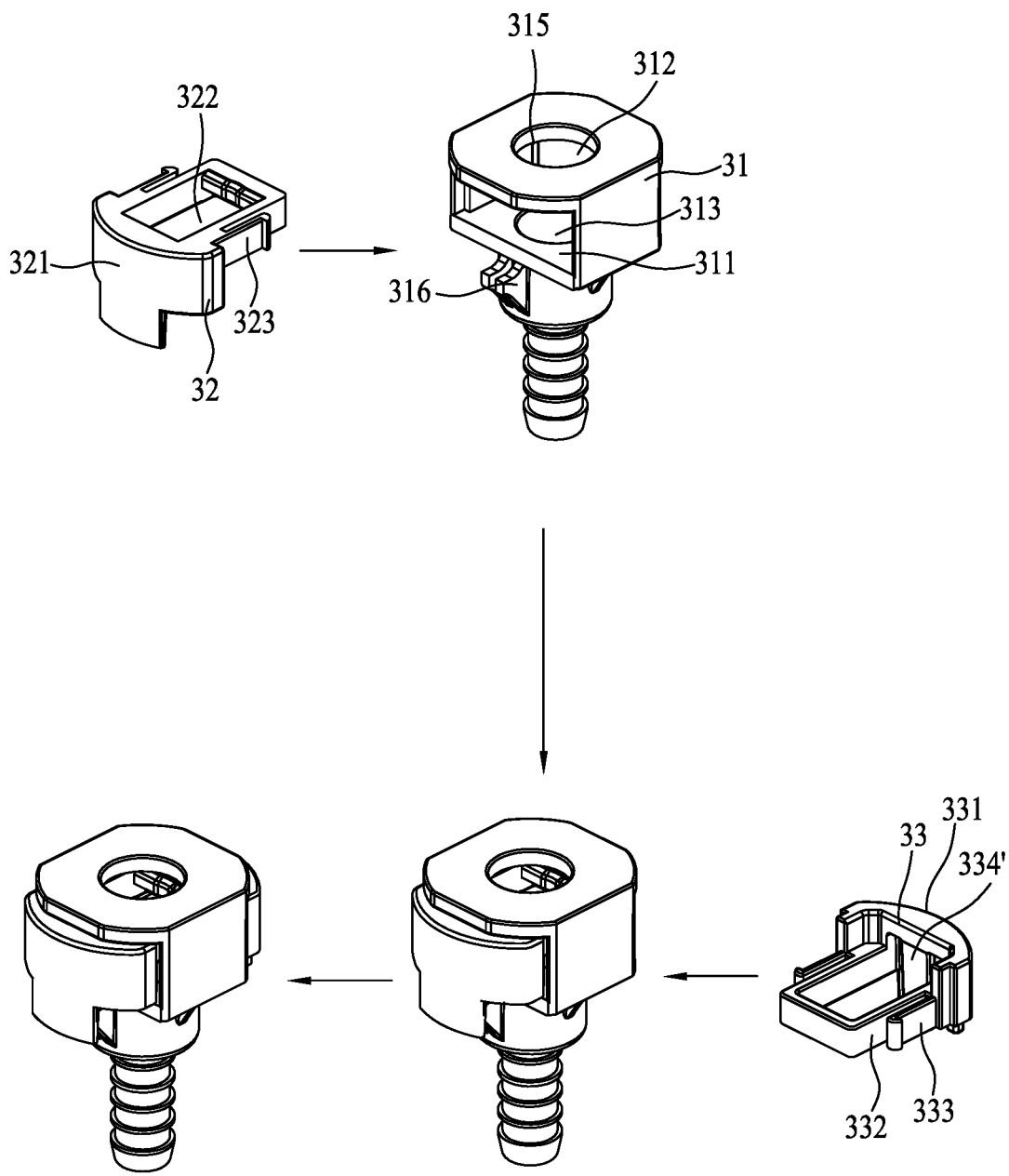
FIG. 12 is a schematic view showing the installation of the left and right elastic blocks according to the second embodiment of the present invention.
Figure 13:
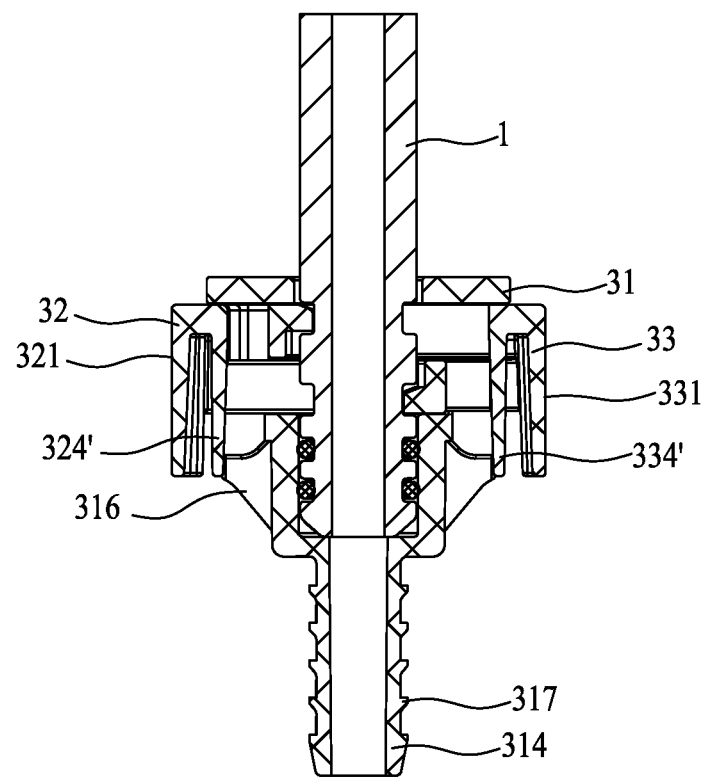
FIG. 13 is a schematic view showing the left and right elastic blocks to hold against the upper pipe according to the second embodiment of the present invention.
Figure 14:
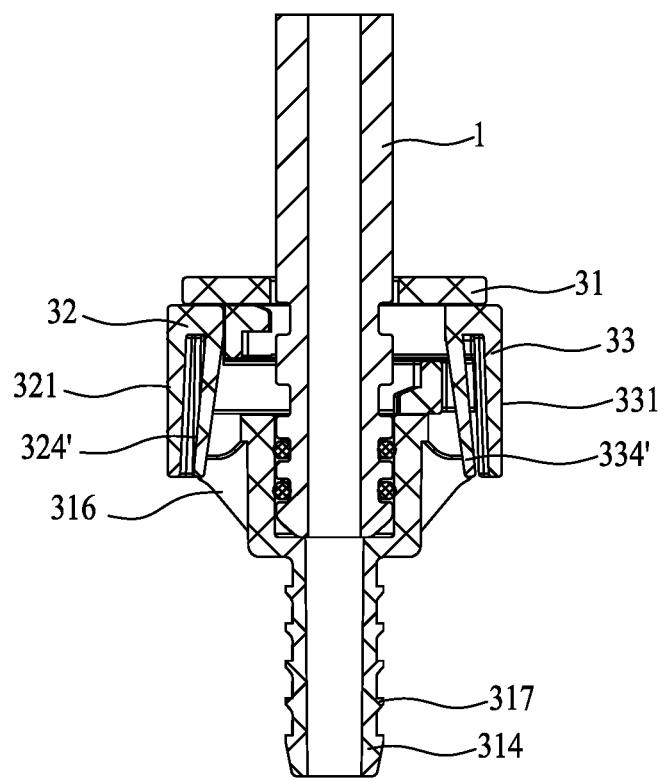
FIG. 14 is a schematic view showing the left and right elastic blocks to release the upper pipe according to the second embodiment of the present invention.

Referring to FIG. 10 and FIG. 14, in a second embodiment of the present invention, the elastic configurations are elastic sheets 324', 334' disposed at the inner sides of the press portions 321, 331 of the left elastic block 32 and the right elastic block 33. The lower ends of the elastic sheets 324', 334' hold against the connecting sleeve 31. The connecting sleeve 31 is provided with protruding blocks 316 to hold against the elastic sheets 324', 334'. The protruding blocks 316 always apply forces to the left elastic block 32 and the right elastic block 33 to hold the upper pipe 1 tightly.

Furthermore, the inner walls of the front ends of the hollow middle portions of the of the buckle pieces 322, 332 of the left elastic block 32 and the right elastic block 33 are provided with engaging blocks 325, 335. A connecting end of the upper pipe 1 is formed with an engaging groove 11 to mate with the engaging blocks 325, 335.

To assemble the present invention, the left elastic block 32 and the right elastic block 33 are pressed, such that the left elastic block 32 and the right elastic block 33 are moved towards each other to compress the springs 324, 334. The hollow middle portions of the buckle pieces 322, 332 of the left elastic block 32 and the right elastic block 33 are aligned with each other. The upper pipe 1 is inserted through the receiving hole 312 of the connecting sleeve 31 and the hollow middle portions of the buckle pieces 322, 332 of the left elastic block 32 and the right elastic block 33 to the connecting hole 313 at the bottom of the opening 311. After connection, the limit step 12 of the upper pipe 1 is pressed against the opening of the receiving hole 312. The left elastic block 32 and the right elastic block 33 are released. The left elastic block 32 and the right elastic block 33 are biased by the elastic configurations to bring the buckle pieces 322, 332 to move outward, and the engaging blocks 325, 335 on the inner walls of the hollow middle portions of the buckle pieces 322, 332 are engaged in the engaging groove 11 of the upper pipe 1 to hold the upper pipe 1 tightly. The lower pipe 2 is connected with the connecting post 314 of the connecting sleeve 31. Thus, the upper pipe 1 and the lower pipe 2 are connected together.

Accordingly, the outlet pipe can be quickly assembled and disassembled by means of the connector to ease the operation. For a narrow space, the present invention can be installed and replaced easily and conveniently, without using a tool during operation.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick connection structure of a faucet outlet pipe, comprising:
   an upper pipe;
   a lower pipe; and
   a connector;
   wherein the upper pipe and the lower pipe being connected through the connector;
   wherein the connector comprises a connecting sleeve, a left elastic block, and a right elastic block, a central portion of the connecting sleeve is transversely formed with an opening, the left elastic block and the right elastic block face each other and are movably installed in the opening to hold against the upper pipe elastically, a top of the connecting sleeve is longitudinally formed with a receiving hole for insertion of the upper pipe, a bottom of the opening is formed with a connecting hole to mate with the upper pipe, and the connecting sleeve is provided with a connecting post extending downward from the connecting hole for connection of the lower pipe;

wherein the left elastic block and the right elastic block each comprise a press portion and a buckle piece which extends from a front end of the press portion and has a hollow middle portion to mate with the upper pipe, and the buckle pieces of the left elastic block and the right elastic block are mutually staggered;

wherein the left elastic block and the right elastic block are provided with elastic configurations thereon; and wherein the elastic configurations are elastic sheets disposed at inner sides of the press portions of the left elastic block and the right elastic block, and lower ends of the elastic sheets hold against the connecting sleeve.

2. The quick connection structure of a faucet outlet pipe as claimed in claim 1, wherein two sides of each buckle piece of the left elastic block and the right elastic block are provided with elastic arms with barbs, an inner wall of the opening is provided with ribs corresponding to the elastic arms, and when the left elastic block and the right elastic block are installed and positioned, the barbs of the elastic arms of the buckle piece are engaged with the ribs.

3. The quick connection structure of a faucet outlet pipe as claimed in claim 1, wherein the connecting sleeve is provided with protruding blocks to hold against the elastic sheets.

4. The quick connection structure of a faucet outlet pipe as claimed in claim 1, wherein an outer wall of the connecting post is formed with skidproof ribs to mate with the lower pipe tightly.

* * * * *